W. DUBILIER.
ELECTRICAL CONDENSER.
APPLICATION FILED JAN. 18, 1916.

1,229,915.  Patented June 12, 1917.

Witness
Johna Beighton

Inventor
William Dubilier
Attorney
William F. Nickel

UNITED STATES PATENT OFFICE.

WILLIAM DUBILIER, OF NEW YORK, N. Y., ASSIGNOR, BY MESNE ASSIGNMENTS, TO DUBILIER CONDENSER CO., INC., A CORPORATION OF NEW YORK.

ELECTRICAL CONDENSER.

1,229,915.      Specification of Letters Patent.      Patented June 12, 1917.

Application filed January 18, 1916. Serial No. 72,837.

*To all whom it may concern:*

Be it known that I, WILLIAM DUBILIER, a citizen of the United States, and a resident of New York, in the county of New York and State of New York, have invented certain new and useful Improvements in Electrical Condensers, of which the following is a specification.

I have perfected an improvement in electrical condensers; and particularly condensers designed for use upon oscillatory or high frequency alternating circuits.

The primary object of my invention is to provide a condenser which can be employed to advantage upon high potential as well as low potential circuits; which can be easily constructed at comparatively small cost; which will be efficient, convenient to manage and satisfactory in operation; and in which the losses and other drawbacks usually met with will be practically eliminated.

Figure 1:
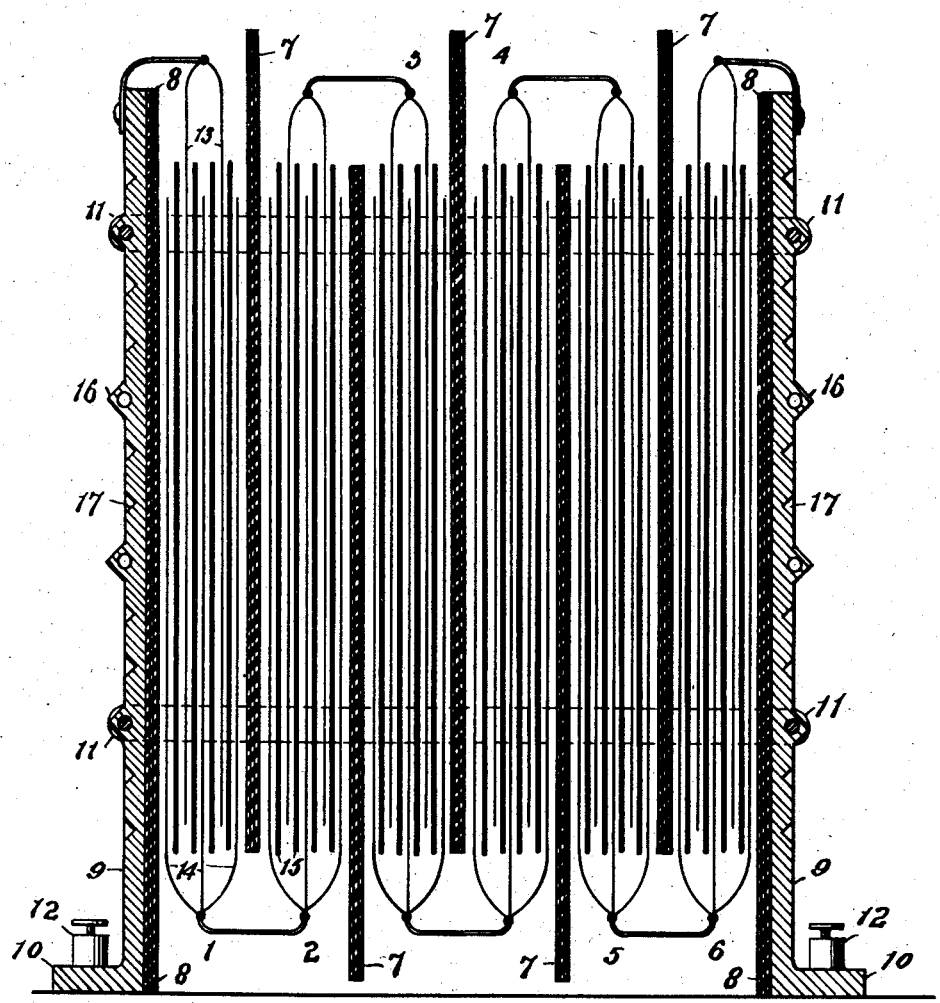
Figure 2:
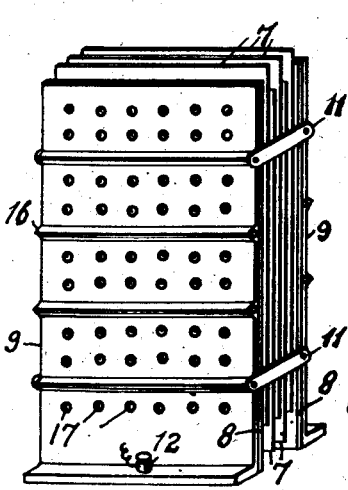

These and other objects and advantages of my invention are set forth in the following description, taken in connection with the accompanying drawings; and the characteristics of my condenser are precisely defined in the appended claims. I disclose herein the best form of my condenser now known to me; but this form is to be taken as merely typical of numerous constructions in which the principle of my invention may be embodied; and I reserve the right to make changes in the shape, size and arrangement of parts to the full extent indicated by the general or broad meanings of the terms in which the claims are expressed. On the drawings:

Figure 1 is a vertical sectional view, illustrating diagrammatically a condenser made according to my invention; and Fig. 2 is a perspective view of the construction shown in Fig. 1.

The same numerals of reference indicate the same parts throughout.

The nature of my invention will be best understood and appreciated by considering first a condenser element, consisting of two conductor plates or "armatures," separated by a body of insulation, or dielectric. It is well known that the capacity of such a device is directly proportional to the dielectric constant; and when high potentials are employed, the dielectric must be stronger than when low potentials are utilized. Further, as the potential difference between the condenser plates becomes greater, an increasing amount of brush discharge takes place at the edge of these plates and the dielectric; and since this loss varies as the square of the voltage, a limit is soon reached beyond which the practical usefulness of the condenser ceases. Hence it is very important to keep the potential difference between adjoining conductor plates as low as possible.

Another effect of this brush discharge, and of the heat generated in the condenser under such conditions, is that the dielectric becomes injured and liable to fail between the plates; and in consequence the efficiency of the condenser is materially decreased. It is also very difficult when the conductor plates are to be subjected to high voltages, to construct a condenser in which brush discharges and other disadvantages, such as hysteresis, ohmic resistance losses, etc., can be prevented; hence to these considerations special attention must be given. Moreover, it is necessary to keep air, moisture and spaces containing vacua, away from the surfaces of the conductor plates, because even small traces of air and moisture may so reduce the strength of the dielectric and the efficiency of the condenser as to cause a breakdown.

To obviate the great losses that might flow from brush discharges at high potentials, I constitute my condenser of a plurality of sections, each of which comprises a number of such condenser elements; and I construct these parts so that they can readily be assembled into a compact unit. By this method, the potential difference between any two plates is kept within proper limits; that is to say, the line potential, which at the terminals of the condenser, may be very high, is divided, so to speak, and graded down; so that any pair of plates in the condenser is subject to only a part or fraction of the total potential. As the number of such condenser elements may be increased at will, a condenser of this sort can be successfully employed for the highest voltages that have yet been obtained; a thing which has heretofore been impracticable. In order to prevent brush discharges occurring with such voltages as actually exist between adjacent oppositely charged plates, I make use of a special arrangement of the sheets or plates of insulation or dielectric and I most effectually avoid letting air, moisture or vacua exist in the condenser near any of the metal plates by securing a perfect, intimate contact between the metal plates and the dielectric over the entire surfaces. By such details of mechanical structure, the best possible results can be secured by the method just outlined.

Referring now to the drawings, I employ the numerals 1 and 2 to indicate the first two sections of my condenser each including several condenser elements; and similar sections are indicated by the numerals 3, 4, 5 and 6. The sections 1 and 2 are separated by an insulating plate 7, preferably of mica, which best answers my purpose; and a similar plate separates the sections 2 and 3, 3 and 4, 4 and 5, and 5 and 6. I also apply insulating plates 8 to the outer face of the sections 1 and 6; and dispose all of the sections between end plates 9, having feet 10, to rest upon any suitable supporting surface. The end plates 9 and the sections will be held together by bars 11 to permit the condenser to be handled as a single unit. Each end plate 9 will have a binding post 12 for the line conductor, and the metal plates 13 of the sections 1 will be joined to a common terminal, adjacent the top of the condenser, and connected to the plate 9 adjacent to it. A like connection will be provided for the plates 13 of the section 6.

Each section is depicted as consisting of elements in the shape of metal plates 13 and 14, between which are sheets of mica 15. The plates 13 of each section are joined to a common terminal adjacent to the top of the condenser; and the plates 14 of each section to a common terminal near the bottom. Also the plates 14 of the section 1 are connected, below, to the plates 14 of the section 2; the plates 13 of the section 2, above, to the plates 13 of the section 3; the plates 14 of the section 3, below, to the plates 14 of the section 4, the plates 13 of the section 4, above, to the plates 13 of the section 5; and the plates 14 of the section 5, below, to the plates 14 of the section 6. The sections are thus placed in series between the end plates 9.

Hence when the total or line potential is applied to the posts 12, this line potential will be divided among the sections and prevented from giving rise to the numerous difficulties which I seek to avoid. If the line potential be 15,000 volts, and my condenser includes, say ten sections, the highest potential in any one section will not be more than 1,500; and the losses are not nearly so great as they would be if the condenser were otherwise constructed. While more plates are needed by my condenser, the heat losses are much reduced and the conduction is better; for the power taken by each plate is relatively much less. Since the losses due to the brush discharge will be proportional to the square of the voltage, as above stated, one can realize that the losses in my condenser will be but a very small percentage of what they would be if the line potential existed between any two neighboring conductor plates.

It will also be observed that the inner ends of the plates 13 and 14 are short of the adjacent ends of the mica sheets 15 between them; that is, the mica sheets overlap the inner ends of the metal plates of the condenser sections. Hence the tendency of adjacent plates to discharge at their edges is nullified; and brush discharges between any two sections are similarly avoided by making the plates 7 between the sections 1 and 2, 3 and 4, 5 and 6 project upward; and the plates 7 between the sections 2 and 3, and 4 and 5, to project downward. By making the ends of the plates 7 thus project alternately upward and downward the joining of the terminals of the conductor plates of adjacent sections in pairs is facilitated; and the projecting ends of the plates 7 intervene between sections having their terminals so connected, and neighboring sections at both the bottom and the top of the condenser.

For the plates 9 I prefer to utilize castings of light weight, but large surface. I may employ aluminum; and I give the plates a number of transverse ribs 16 on their outer surfaces, with recesses or depressions 7 between them. These ribs, with the recesses, not only increase the area of the outer surface of the plates, so as to make them radiate such heat as is generated in the condenser more quickly, but they make the plates stronger and stiffer, without making the condenser any heavier. The bars are fastened by bolts engaging threaded holes in the ends of the ribs 16.

In practice the condenser will not be so thick, relatively to its height as illustrated in Fig. 1; this figure not being drawn to scale, but being largely diagrammatic in order that the parts may be portrayed with greater clearness. I of course may vary the relative dimensions as convenience or necessity may dictate.

My condenser must be manufactured according to a special method, when the above construction is desired, in order to eliminate air, moisture, and small spaces containing vacua betwen the conductor plates and the dielectric. For this purpose, the condenser will be given a bath in an insulating adhesive of suitable composition, after the parts are assembled; and then subjected to pressure so that the adhesive will permeate the whole structure; penetrating in thin layers between the conductor plates 13 and 14, the mica sheets 15, and the plates 7. This adhesive must be carefully chosen, to avoid hysteresis, and only certain kinds of wax will answer.

The condenser is therefore set up by juxtaposing the sections, applying the end plates 9, and pressing the sections and end plates together. The bars 11 are then put on, and the whole immersed in liquid wax and heated. The heating expels air bubbles and moisture and the wax impregnates the whole structure; getting in between the insulation and the condenser plates throughout the entire condenser structure. As a result, the sheets 15 and plates 7 will have a thin coating of wax when the condenser is finished, and the conductor plates 13 and 14 will have intimate contact with the insulation over their entire surfaces. No air bubbles or vacua will be left.

The insulating adhesive bath is supplemented by the action of a vacuum, which makes the expulsion of the air from the condenser complete. I may either arrange to have the condenser and the vessel containing the wax in a vacuum while the bath is taking place; or I may subject the condenser after the bath to the action of a suction or vacuum pump. In either case, the desired result will be gained. When the condenser is taken out of the vacuum, the normal pressure of the atmosphere will compress the parts of the condenser into a solid mass; making even more perfect the contact between the conductor plates and the dielectric. As it cools off, the end plates 9 may be caused to prevent the condenser from subsequently expanding; and the bars 11 may be especially constructed for this purpose; as by slotting the ends, and screwing up the fastening bolts when the condenser has cooled and its smallest volume been reached.

Of course other insulating or dielectric material than mica can be employed; but it must be homogeneous and able to withstand the tension and heat by which high potentials are attended; and any required number of sections chosen when a given set of conditions are to be met. The number of plates or condenser elements in each section can also be varied as desired or as may be necessary.

A condenser built as above will be a single unit, admirably adapted for high potentials, with practically no danger of injury, and the complete elimination of heavy losses. It will be relatively small, compact, portable, easy to handle, and can be made at comparatively little expense. At the same time its adaptability for low potentials is maintained to the fullest extent.

Having described my invention, what I believe to be new, and desire to secure and protect by Letters Patent of the United States is:

1. A high tension condenser unit consisting of sections for dividing the potential among them beyond brush discharge voltage, and comprising incasing means for providing heat radiating and conducting surfaces associated with said sections.

2. A condenser unit consisting of a plurality of sections alternately connected together at one end, means for insulating said sections from each other and projecting beyond the same alternately at the opposite ends and means comprising heat radiating surfaces for holding the unit together.

3. A condenser unit comprising sections, and insulating plates between the sections, said plates being arranged to project alternately in opposite directions, whereby the terminals of the sections can be joined together alternately in pairs.

4. A condenser unit comprising sections, and insulating plates between the sections, said plates being arranged to have their ends projecting alternately in opposite directions, whereby the terminals of the sections can be joined together in pairs at both ends of said plates, the projecting ends of the plates intervening between the sections having their terminals so connected, and adjacent sections.

5. A condenser unit comprising conductor plates with intervening sheets of insulation constituting a dielectric, and end plates of relatively small mass and relatively large surface, acting to compress the sections and hold the same together.

6. A condenser unit including sections, each comprising conductor plates with intervening sheets of insulation constituting a dielectric, said sheets having a layer of insulating adhesive between them and the conductor plates, and being arranged to overlap the edges of said conductor plates, and insulating plates between the sections, arranged to have their ends project alternately in opposite directions, whereby the terminals of the sections can be joined together in pairs between said projecting ends.

7. A condenser unit including sections, each comprising conductor plates with intervening sheets of insulation constituting a dielectric, said sheets having a layer of insulating adhesive between them and the conductor plates, and being arranged to overlap the edges of the conductor plates, insulating plates between the sections, arranged to have their ends project alternately in opposite directions, whereby the terminals of the sections can be joined together in pairs between said projecting ends, and end plates for the condenser of relatively small mass and relatively large surface.

8. The method of making a condenser unit which consists in providing sections by associating insulating sheets with conductor plates, arranging said sections side by side with plates of insulation between them, so that the plates of insulation will have their ends projecting alternately in opposite directions, whereby the terminals of the sections can be joined in pairs between said projecting ends, disposing said plates of insulation and said sections between end plates and applying means to bind the end plates and sections together, impregnating the condenser with insulating adhesive, and subjecting it to the action of heat and a vacuum, and finally to pressure to make a solid mass.

9. A condenser unit made up of a plurality of sections connected so that the potential applied to the unit is divided among the sections, the ends of said sections being alternately connected together, and means between the sections and projecting beyond the unconnected ends and sections for insulating the sections and connections from one another.

10. A condenser unit comprising sections, and insulating plates between the sections, said plates being arranged to project beyond the sections alternately in opposite directions, whereby the terminals of the sections can be joined together alternately in pairs.

11. A condenser unit comprising sections, and insulating plates between the sections, said plates being arranged to have their ends projecting beyond the sections alternately in opposite directions, whereby the terminals of the sections can be joined together in pairs at ends of said plates, the ends of the plates of adjacent sections having terminals so connected.

12. A condenser unit including sections, each comprising conductor plates with intervening sheets of insulation constituting a dielectric, said sheets having a layer of insulating adhesive between them and the conductor plates, and being arranged to overlap the edges of said conductor plates, and insulating plates between the sections, arranged to have their ends project alternately in opposite directions beyond the sections, whereby the terminals of the sections can be joined together in pairs between said projecting ends.

13. A condenser unit including sections, each comprising conductor plates with intervening sheets of insulation constituting a dielectric, said sheets having a layer of insulating adhesive between them and the conductor plates, and being arranged to overlap the edges of the conductor plates, insulating plates between the sections, arranged to have their ends project alternately in opposite directions beyond the sections, whereby the terminals of the sections can be joined together in pairs between said projecting ends, and end plates for the condenser of relatively small mass and relatively large surface.

14. A condenser comprising a group of juxtaposed units, each unit comprising interleaved condenser elements of opposite polarity, a series of conductors alternately connecting corresponding elements of positive or negative polarity of adjacent units, insulation separating said units and projecting beyond adjacent connected groups of terminals and connections.

15. A condenser comprising a plurality of juxtaposed units, each unit comprising a group of interleaved condenser elements of opposite polarity, terminals for said two groups of elements disposed respectively at opposite ends of the units, connections extending between adjacent pairs of like terminals, insulation separating said units and projecting beyond adjacent connected groups of terminals and connections.

16. A condenser comprising a group of juxtaposed condenser elements, and terminals for said condenser comprising plates of large heat radiating surface disposed on opposite sides of said group.

17. A condenser comprising a group of juxtaposed condenser elements, and terminals for said condenser comprising plates of large heat radiating surface disposed on opposite sides of said group, and means acting to compress said elements between said terminals.

Signed at New York, in the county of New York, and State of New York, this 11th day of January, A. D. 1916.

WILLIAM DUBILIER.

DISCLAIMER.

1,229,915.—*William Dubilier*, New York, N. Y. ELECTRICAL CONDENSER. Patent dated June 12, 1917. Disclaimer filed March 16, 1920, by the assignee, by mesne assignments, *Dubilier Condenser Co., Inc.*

Enters its disclaimer—

"To such parts of the thing patented as it does not choose to claim or to hold by virtue of the above-mentioned patent or assignments as follows:

"To that portion of the specification, page 3, lines 39 and 40, which reads—'Of course other insulating or dielectric material than mica can be employed;'

"To high tension condenser units consisting of sections for dividing the potential among them beyond brush discharge voltage, and comprising encasing means for providing heat radiating and conducting surfaces associated with said sections, as specified in claim 1, except in regard to such condenser units wherein the sections have a mica dielectric."

[*Official Gazette March 30, 1920.*]

DISCLAIMER.

1,229,915.—*William Dubilier*, New York, N. Y. ELECTRICAL CONDENSER. Patent dated June 12, 1917. Disclaimer filed November 5, 1920, by the assignee, *Dubilier Condenser Co., Inc.*

Enters its disclaimer—

"To such parts of the thing patented as it does not choose to claim or to hold by virtue of the above-mentioned patent or assignments, as follows:

"To claims 3, 4, 9, 10, 11, 14, and 15."

[*Official Gazette November 16, 1920.*]